United States Patent [19]
Buckland

[11] Patent Number: 5,815,737
[45] Date of Patent: Sep. 29, 1998

[54] APPROACH FOR IDENTIFYING A SUBSET OF ASYNCHRONOUS TRANSFER MODE (ATM) VPI/VCI VALUES IN THE COMPLETE VPI/VCI RANGE

[75] Inventor: Kenneth M. Buckland, Burnaby, Canada

[73] Assignee: PMC-Sierra, Inc., Burnaby, Canada

[21] Appl. No.: 461,450

[22] Filed: Jun. 5, 1995

[51] Int. Cl.$^6$ ...................................................... G06F 17/30
[52] U.S. Cl. .......................... 395/905; 370/395; 370/397; 370/399; 370/409; 395/601
[58] Field of Search ............... 395/600, 185.02, 395/601, 905; 370/60, 395, 397, 399, 409, 94.1

[56] References Cited

U.S. PATENT DOCUMENTS

| | | | |
|---|---|---|---|
| 4,677,550 | 6/1987 | Ferguson ................................. | 395/603 |
| 5,271,010 | 12/1993 | Miyake et al. .......................... | 370/94.1 |
| 5,323,389 | 6/1994 | Bitz et al. ............................... | 370/60.1 |
| 5,467,349 | 11/1995 | Huey et al. ............................. | 370/60.1 |

FOREIGN PATENT DOCUMENTS

| | | |
|---|---|---|
| 0419889-A2 | 4/1991 | European Pat. Off. . |
| 05201116-A1 | 12/1992 | European Pat. Off. . |

*Primary Examiner*—Thomas G. Black
*Attorney, Agent, or Firm*—Pascal & Associates

[57] ABSTRACT

A method of searching a table stored in a memory for a record identifying a stored data word corresponding to a binary input data word, wherein the table is comprised of a plurality of records containing a select value field, a left search table address field, a right search table address field, and left and right search table address leaf fields, comprised of (a) indicating a particular single bit of the binary input data word based on a value stored in a select value field, (b) reading either the left or right search table address fields of the record containing the value stored in the first select value field, depending on the binary value of the particular single bit of the input data word indicated, (c) in the event a leaf field corresponding to the read left or right search table address stores a first binary value, repeating steps (a) and (b) using a record identified by the read left or right search table address, (d) in the event a left field corresponding to the read left or right search table address stores a second binary values, terminating the search and use the left or right search table address as an address for the data word stored in a second table.

15 Claims, 4 Drawing Sheets

| | EXIT | SELECT | | | | | |
|---|---|---|---|---|---|---|---|
| | | | | | | | } UNUSED |
| A | 0 | 1 | 1 | 0 | 1 | 1 | } 1ST SEARCH BIT |
| C | 0 | 0 | 0 | 0 | 1 | 0 | |
| E | 0 | 0 | 0 | 0 | 1 | 0 | } 2ND SEARCH BIT |
| G | 0 | 0 | 0 | 0 | 0 | 1 | |
| F | 0 | 0 | 0 | 0 | 0 | 0 | |
| | 1 | | | | | | } 3RD SEARCH BIT |
| B | 0 | 0 | 0 | 0 | 0 | 1 | |
| | 1 | | | | | | |
| D | 0 | 0 | 0 | 0 | 0 | 0 | |
| | 1 | | | | | | |
| | 1 | | | | | | } 4TH SEARCH BIT |
| | | | | | | | |
| | | | | | | | |
| | 1 | | | | | | |
| | 1 | | | | | | |

APPROACH FOR IDENTIFYING A SUBSET OF ASYNCHRONOUS TRANSFER MODE (ATM) VPI/VCI VALUES IN THE COMPLETE VPI/VCI RANGE

FIELD OF THE INVENTION

This invention relates to the field of communication using asynchronous transfer mode (ATM) data cells, and in particular to a method and apparatus for quickly identifying a virtual path identifier/virtual circuit identifier (VPI/VCI) word in the header of an ATM data cell.

BACKGROUND TO THE INVENTION

An ATM cell is a combination of binary data bits which is used for efficient communication of data having various bandwidths, such as digitized voice, digitized video, computer generated data, etc. along the same data channel. ATM cells are distinguished from frame relay cells in that ATM cells are all standardized to have the same number of bits, while frame relay cells have different numbers of bits.

An ATM cell is comprised of a header, which contains routing information, and a data payload. The header is comprised of a virtual path identifier or virtual channel identifier, referred to in the industry and herein as VCI/VPI, and which is used by ATM switching equipment to route the cell, the switching equipment typically being self-routing. For that reason, an ATM switch performs header translation. The VPI/VCI address is standardized as being comprised of 28 binary bits.

Header translation typically involves extracting the header from the cell, matching of the VPI/VCI address, validation of the cyclic redundancy check (CRC) data, and transfer of the data payload to a receive FIFO register. Matching of the VPI/VCI address utilizes a significant amount of scarce hardware resource. The present invention is directed to a method and apparatus for significantly reducing the amount of that resource that is required. The method and apparatus will be described herein as relating to matching of a VPI/VCI address, but it can be used in a generic manner in any other field which requires matching of one data word to another.

Two general methods have been used to match VPI/VCI addresses with addresses stored in a virtual circuit table (VC Table), since the 28 bits are too many to allow the straightforward addressing of parameters stored in a VC Table.

The first method has the ATM system restrict the range of VPI/VCI addresses used so that they are different for only a limited number of the 28 bits. The restricted number of bits are used to directly address a VC Table.

The second method makes use of some sort of content addressable memory. However this requires special content addressable memory hardware, which can utilize tables or tree searches.

SUMMARY OF THE INVENTION

The present invention provides means and a method for an optimized tree search which makes only limited use of memory, and which can be updated readily when VPI/VCI addresses must be added or removed from the group being identified. It also is able to make VPI/VCI identification in a very short period of time. The VPI/VCI addresses can have any arbitrary 28 bit sequence, for the ATM application, and clearly any arbitrary sequence of any other number of bits for other applications.

In accordance with an embodiment of the invention, a method of searching a table stored in a memory for a record identifying a stored data word corresponding to a binary input data word, wherein the table is comprised of a plurality of records containing a select value field, a left search table address field, a right search table address field, and left and right search table address leaf fields, is comprised of the steps of: (a) indicating a particular single bit of the binary input data word based on a value stored in a select value field, (b) reading either the left or right search table address fields of the record containing the value stored in the first select value field, depending on the binary value of the particular single bit of the input data word indicated, (c) in the event a leaf field corresponding to the read left or right search table address stores a first binary value, repeating steps (a) and (b) using a record identified by the read left or right search table address, (d) in the event a left field corresponding to the read left or right search table address stores a second binary value, terminating the search and use the left or right search table address as an address for the data word stored in a second table.

In accordance with another embodiment, a method of searching a table stored in memory for a record containing a stored data value corresponding to an input data value is comprised of: (a) identifying a single bit of the input data value, (b) searching a corresponding bit of each stored data value from one end of the table toward the other until a change in the value of the corresponding bit is detected, (c) looking up a leaf bit, stored in association with the identification of the bit of the input data value, which indicates whether the changed value is part of the stored data value to be located, (d) in the event the leaf bit is of one binary value, repeating steps (a), (b) and (c) using a less significant bit as the identified single bit, but searching the table in an opposite direction, (e) in the event the leaf bit is of another binary value, terminating the search and identifying a record containing the changed value as the stored data value to be located.

In accordance with another embodiment, a searching apparatus is comprised of: (a) a memory storing a search table, the search table comprising records, each record comprising a select word, a left leaf field, a left address field, a right leaf field and a right address field, (b) apparatus for receiving an input word to be searched, (c) apparatus for selecting one bit of the input word based on a value in a select word of a first record, (d) apparatus for reading a left or right address field in the record, based on a binary value of the one bit, (e) apparatus for reading a left or right leaf field in the record based on the binary value of the one bit, (f) apparatus for selecting another record based on data stored in the left or right address field in the event of one particular binary value being stored in a corresponding left or right leaf field, (g) apparatus for providing the data stored in the left or right address field at an output port in the event of another particular binary value being stored in the corresponding left or right leaf field, as an address to another table for identifying a record corresponding to the input word.

BRIEF INTRODUCTION TO THE DRAWINGS

A better understanding of the invention will be obtained by reading the description of the invention below, with reference to the following drawings, in which:

FIG. 1 is a block diagram of a receiver system that can be used in an ATM switching system, FIG. 2 illustrates a search table, FIG. 3 illustrates the content of a VC table, and the process of a search tree, FIG. 4 is a block diagram of a system that can be used to implement the invention, and FIG. 5 illustrates a bit selector table.

DETAILED DESCRIPTION OF THE INVENTION

Figure 1:
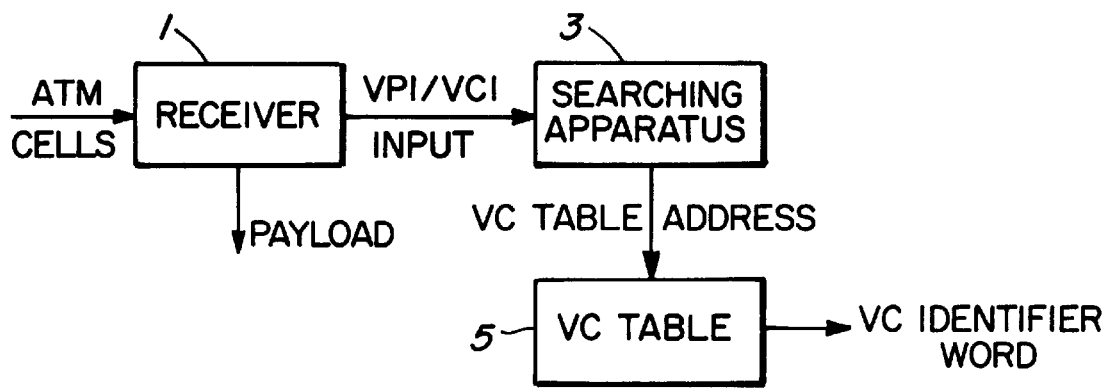

Turning first to FIG. 1, a data stream of ATM cells is received at receiver 1. Receiver 1 detects the header, and in particular the 28 bit VPI/VCI address, and provides the VPI/VCI address at an input of searching apparatus 3. It will in some cases strip the VPI/VCI address from each ATM cell and provide the data payload at another output for processing by other apparatus forming no part of the present invention.

The searching apparatus receives the VPI/VCI address and derives an address to a VC table 5. VC table 5 stores actual full 28 bit addresses, and upon being addressed by the searching apparatus 3, provides 28 bit addresses as output data words.

Searching apparatus 3 contains a search table stored in a memory, such as one shown in FIG. 2, which, as will be described below, provides an address to the VC table. The VC table contains 28 bit addresses generally shown as 7 in FIG. 3, that can be used to access parameters related to the virtual circuit of concern in an external circuit which does not form part of the present invention.

The search table is comprised of records (shown for example as A, B, C, D, E, F, and G) containing several fields. The first field, referred to as a select field, contains a binary word which identifies a single bit in the input word which is to be considered, e.g. a highest significant bit of concern. The record also contains left and right address words and corresponding left and right leaf bits.

As noted above, the select word determines which bit of the 28 bit VPI/VCI input address that should be inspected for a binary tree search branching decision. This value monotonically decreases as the tree is searched. The left and right leaf bits are a single bits that indicate whether the left branch or right branch is a terminating branch, i.e. whether the search is at this point terminated. In the example given, a binary "0" indicates that the search is not to be terminated, and a binary "1" indicates that the search is to be terminated.

The left address and right address fields hold the address of the search table entry containing the next branch if a decision to branch left or right are made.

Thus if the right or left leaf equals "1", the address in the associated right or left address field is a VC table address and is output to the VC table.

If the right or left leaf equals "0", the address in the associated right or left address field is an address to the next record in the search table.

Figure 2:
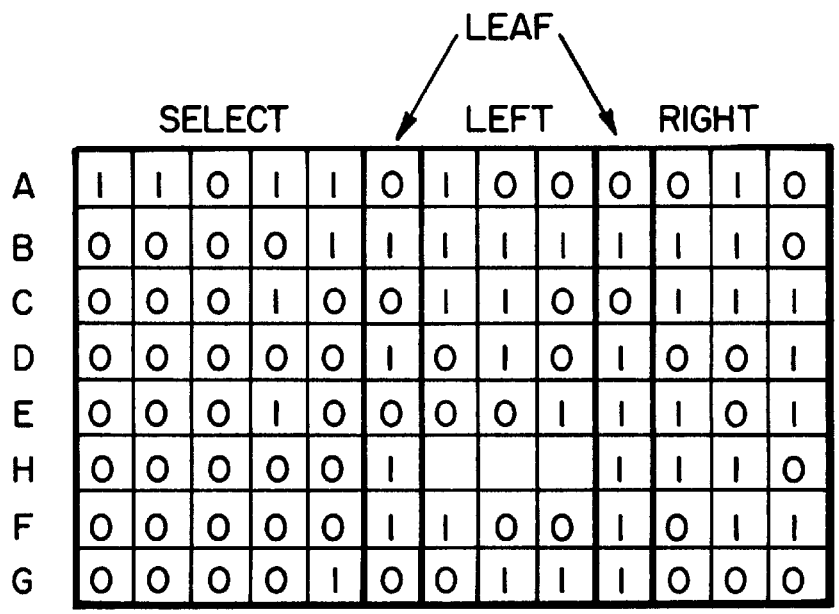

For example, assume that a 28 bit VPI/VCI address is received which corresponds to the word shown beside the X in FIG. 2. A preceding decision is made to look only at the least significant 3 bits in the 28 bit sequence, since only 8, 28 bit addresses exist in the VC table (those enclosed in rectangles in FIG. 3). As may be seen in FIG. 2, the select binary value 11011 in the search table entry point, record A, indicates bit number 27, the 28th (most significant bit). Since the search begins from the largest to the smallest VPI/VCI address value, the search begins to the right from the first branch A (see FIG. 3).

The right leaf bit value in record A is a 0, indicating that the search is not terminated. The corresponding right address value is 010, which is the address of the next record containing the next select value which identifies the next input VPI/VCI address bit which is to be inspected, binary 010, or the third most significant bit from the right (i.e. bit number 2 designates bits 0, 1, 2, or the third bit from the right).

Record address 010 designates record E, using the select value as the address. Record C, which contains the same select address, is not chosen since it designates a VC table address which is much lower in value, i.e. much farther to the right than address E.

The leaf bits in this record are read, and the right leaf bit is a 1, indicating that the search is here terminated. The right address of this record E is output to the VC table, which returns the X value as a VC identifier word (FIG. 1), which can be utilized to access parameters related to the VPI/VCI address concerned.

It may thus be seen that search table entries are used that include left and right branching addresses (addresses of new search table entries), and a select field which specifies on which bit of the VPI/VCI address a branching decision should be made. It is the select field which makes the search efficient, because it allows each branching decision to be made based on only the first bit in which two branches differ. That is, as two VPI/VCI addresses are compared, starting with the most significant bit (MSB)—leftmost, and moving to the least significant bit (LSB)—rightmost, the two can be fully discriminated based on the first bit in which they differ. No other bits after that bit, regardless of how much they differ, need to be considered.

Figure 3:
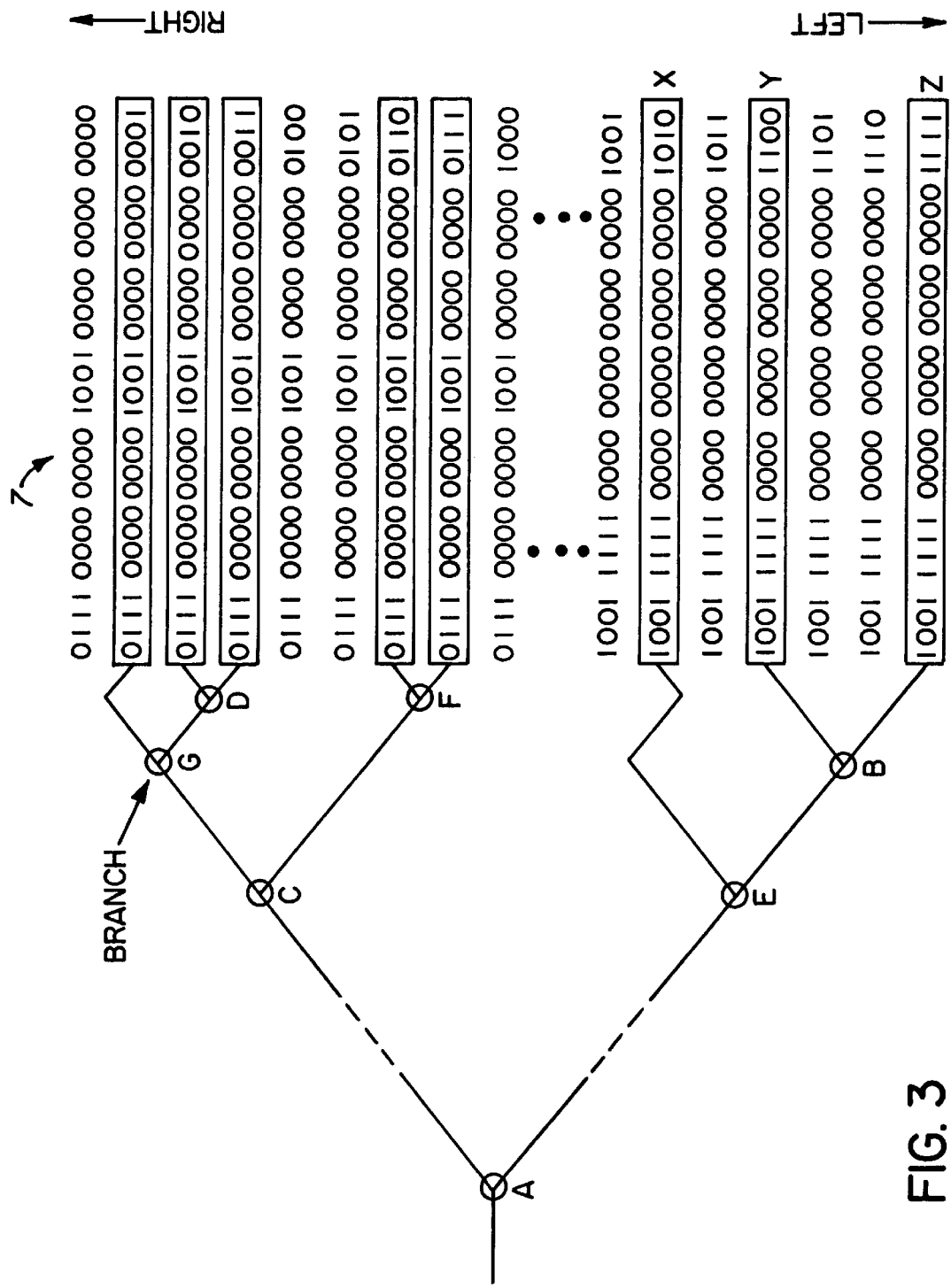

In the search tree example shown in FIG. 3, the VPI/VCI address X can be discriminated fully from addresses Y and Z using only the third bit from the right. That discrimination is made at branch point E, which is represented with a search table entry as indicated in FIG. 2.

By always restricting discrimination decisions to the first bit in which two branches differ, the discrimination process itself is minimized (only one bit need be inspected at each branch) and the search tree is kept organized. This organization facilitates the ready addition and removal of VPI/VCI addresses from the group to be identified, and it ensures that the depth of tree is limited to the number of bits in the VPI/VCI address. Further, because the binary tree is kept simple, it is ensured that the number of search table entries (branching points) is always one less than the number of VC table entries which must be identified.

Figure 4:
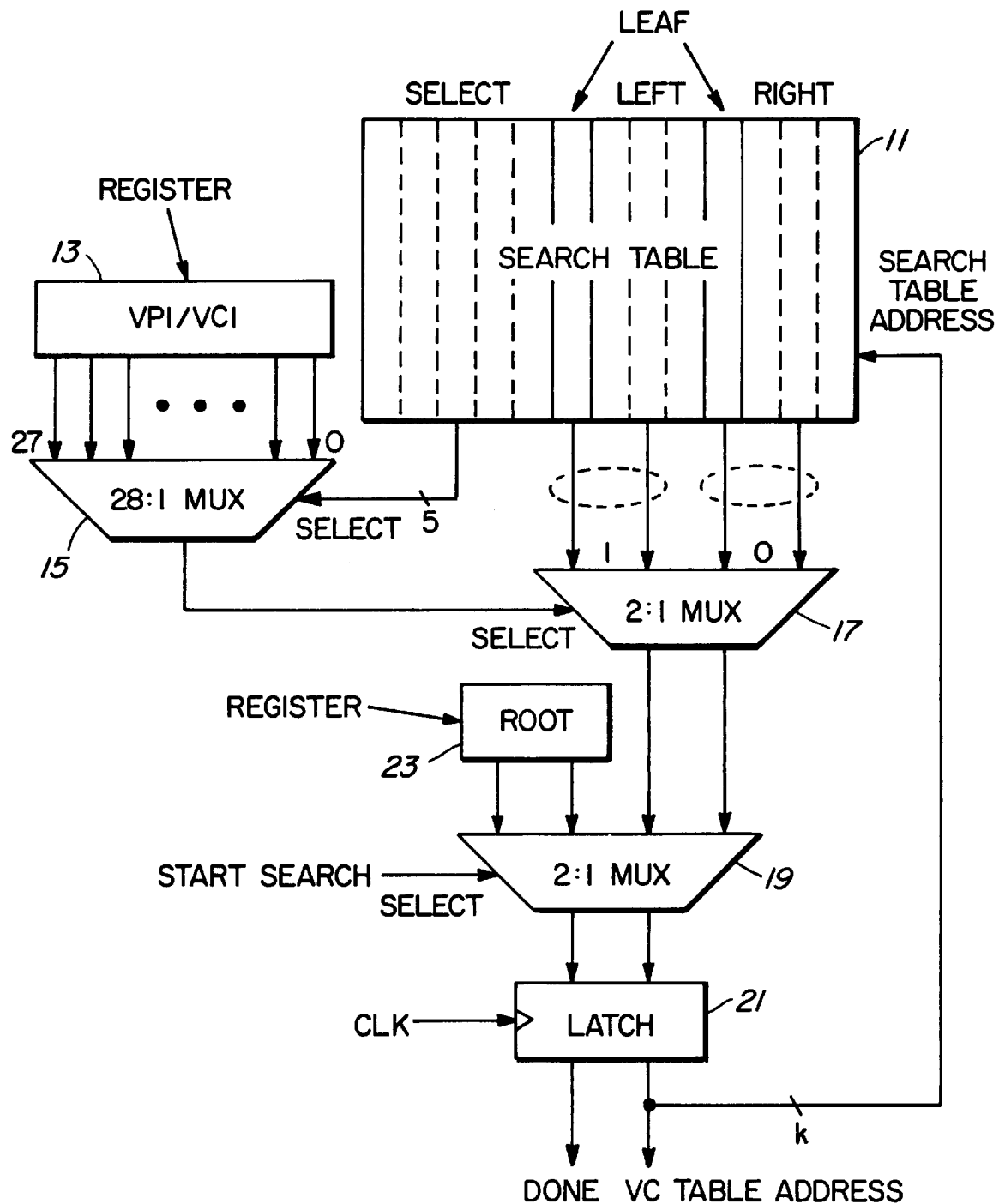

FIG. 4 is a block diagram of an embodiment of the invention which may further aid in understanding the invention. A search table 11 is stored in a memory, such as a random access memory (RAM), and corresponds to the table an example of which is illustrated in FIG. 2.

The 28 bit VPI/VCI address input word or other data word to be searched is received and stored in register 13. Register 13 provides each bit of the input word to corresponding inputs of a 28:1 multiplexer 15. The select input of multiplexer 15 receives a select word from a record of the search table 11, and designates which bit of the input word should be output from multiplexer 15. The value of this bit will be binary 0 or 1.

The left leaf and left address of that record are applied to one input of a 2:1 multiplexer 17, and the right leaf and right address of that record are input to another input of multiplexer 17. The value of the selected bit from the input word, output from multiplexer 15 is applied to the select input of multiplexer 17, and determines which of the left leaf and left address or right leaf and right address are output from multiplexer 17.

The output of multiplexer 17 is applied through a 2:1 initialization multiplexer 19, the function of which will be described later, and into latch 21. The address portion of the output signal latched in latch 21 is used as an address into the search table, in the event that the leaf value is 0, and is provided to the VC table 5, as described earlier, if the leaf value is 1. If the leaf value is 1, it is provided as an indicator on the output "done" by latch 21. If the value is "0", it is considered that the search is not completed, and the VC table does not accept the address value output from the latch.

The table address input to the search table, corresponding to the select value, thus selects another record designated by the search table address input. This designates the next LSB of the input word to be searched, and the select value is input as a select signal to multiplexer 15, e.g. bit 2 (the third from the right). This bit is thus passed through multiplexer 15, and its value indicates whether the right or left address value should be passed through multiplexer 17. In the example shown, the value of the third significant bit from the right (see VPI/VCI address X in FIG. 3) is a 0, and thus the right address and right leaf bit are passed through multiplexer 17. Since the value of the right leaf bit is a 1, this is a terminating address value. That address value is thus accepted by the VC table, due to the leaf bit 1 appearing at the "done" output of the latch 21.

If the leaf bit had not been 1, the search table address output from latch 21 would have indicated the next record having a select value which corresponds to that address. This select value would have indicated which bit of the input word to pass as a select value into multiplexer 17, the right or left leaf bits and right or left addresses would pass through multiplexer 17, and the process would repeat until a leaf bit having the value 1 is detected.

In order to initialized the process a first search table address to search, and a 0 bit value leaf, are input from an external source, such as a DIP switch or from a microprocessor, to a root register 23. Those values are applied from the root register 23 to an input to multiplexer 19. To start the process, a start search signal 1 is applied (e.g. from a microprocessor) to the select input of multiplexer 19. The first search table address and the 0 leaf bit value are passed through multiplexer 19, and subsequently the first search table address is used as the search table address to search table 11 as described above.

Once the multiplexer has passed the initial search table address value, the select value is changed to a 0, allowing all subsequent left or right table addresses from the search table 11 to pass through multiplexer 19.

It should be noted that the initialization process will repeat for each VPI/VCI address which is received, i.e. for each ATM cell which is received, in order that the VPI/VCI address for each cell would be properly identified.

While a description of the invention has been made above in general operation and in block diagram form, it is contemplated that the invention can be realized in specific hardware form, such as shown in FIG. 4, or that specific hardware form can be realized in software controlling a microprocessor, or it can be realized by software controlling a microprocessor operating in accordance with the following process, described in pseudo-code, wherein the variable Search Key represents the VPI/VCI address, and the title is "Get VC Table Address":

```
Get VC Table Address(Search Key)
    local variables: Search Table Address, Done, VC
        Table Address
    if (EmptyTree="true") return("null") [comment:
        search stopped]
    Search Table Address=Root
    Done=Root Leaf
    while not(Done):
        if (Search Key[Select [Search Table
            Address] ]="1"):
            [comment: single Search Key bit identified]
            Done=Let Leaf [Search Table Address]
            Search Table Address=Left [Search Table
                Address]
        otherwise:
            Done=Right Leaf [Search Table Address]
            Search Table Address=Right [Search Table
                Address]
    VC Table Address=Search Table Address
    return (VC Table Address)
```

New VPI/VCI address entries may be added to the group being identified. Given a Search Key, the following process determines the proper insertion point for a new search table entry (branch descriptor), and will redirect the necessary search table pointers to insert the new entry. It is preferred that a copy of the search tree should be maintained in software which is separate from dedicated search hardware, in order that processing of the steps can proceed without search hardware involvement. When this is done only the instructions indicated with a "*" involve changes that must be made to the actual hardware registers and tables. Each insertion involves the creation of one new search table entry, and the modification of one other search table entry or modification of the values root and root leaf.

As an example of the insertion of a new entry, assume that the search table is to point to the VPI/VCI address Y in FIG. 3. In this case a new record H is added following entry H, which has a select value 00000, a right leaf bit 1, and a right address 110. The right leaf bit of record B is changed to a 0, and the right address of record B is changes from 110 to 101. The right address 110 points at entry Y (the second, third and fourth bit values from the right of VPI/VCI address Y).

The following is a description of a new VPI/VCI address to the search tree, using pseudo-code, entitled Insert Branch:

```
Insert Branch(Search Key)
    local variables: VC Table Address, Free Search Table
        Address, Done, Parent, Free VC Table Address,
        Close Key, Decision Bit, Search Table Address
    if (Empty Tree="true"):
        Free VC Table Address=Get VC Table Address()
        Root=Free VC Table Address              *
        Root Leaf="1"                           *
        VC Key[Free VC Table Address]=search key  *
        write other parameters to VC Table at Free
            VC Table Address                    *
    otherwise:
        VC Table Address=Get VC Table Address(Search
            Key)
        Close Key=VC Key[VC Table Address]
        if (Search Key ≠ Close Key):
            Free Search Table Address=Get Search Table
                Address ()
            Free VC Table Address=Get VC Table
                Address()
            VC Key[Free VC Table Address]=Search Key  *
            write other parameters to VC Table at Free
                VC Table Address                    *
            Decision Bit=(width of Search Key) - 1
            [comment: initial value of Decision Bit is
```

-continued

```
          27 for VPI/VCI search]
       while (Search Key[Decision Bit]=Close
          VC[Decision Bit]):
       [comment: single Search Key and Close VC
          bits identified]
          Decision Bit=Decision Bit - 1
       Search Table Address=Root
       Parent=Root
       Done=Roof Leaf
       while (not(Done) and Select[Search Table
          Address]>Decision Bit):
          Parent=Search Table Address
          if (Search Key[Select[Search Table
             Address] ]="1"):
             [comment: single Search Key bit
                identified]
                Done=Left Leaf[Search Table Address]
                Search Table Address=Left[Search
                   Table Address]
          otherwise:
                Done=Right Leaf[Search Table
                   Address]
                Search Table Address=Right [Search
                   Table Address]
       [comment: this is what is done when
          insertion location is found]
       Select[Free Search Table
          Address]=Decision Bit                            *
       if (Search Key[Decision Bit]="1"):
       [comment: single Search Key bit identified]
          Left Leaf[Free Search Table Address]
             ="1"                                          *
          Left[Free Search Table Address]=Free VC
             Table Address                                 *
          Right Leaf[Free Search Table
             Address]=Done                                 *
          Right[Free Search Table Address]=Search
             Table Address                                 *
       otherwise:
          Right Leaf[Free Search Table Address
             ="1"                                          *
          Right[Free Search Table Address=Free
             VC Table Address                              *
          Left Leaf[Free Search Table Address]
             =Done                                         *
          Left[Free Search Table Address]=Search
             Table Address                                 *
       if (Search Table Address=Root):
          Root Leaf="0"                                    *
          Root=Free Search Table Address                   *
       otherwise:
          if(Left[Parent]=Search Table Address):
             Left Leaf[Parent]=
"0"                                                        *
             Left[Parent]=Free Search Table
                Address
                                                           *
          otherwise:
             Right Leaf[Parent]=
"0"                                                        *
             Right[Parent]=Free Search Table
                address
                                                           *
```

To remove VPI/VCI addresses from the group being identified, entries must be deleted from the search tree. An example of a process for such deletion is given below, entitled Delete Branch, in pseudo-code. Given a VPI/VCI address (referred to as Search Key), this process will locate the search table entry (branch descriptor) to be deleted and will redirect the necessary search table pointers to delete it. If a copy of the search tree is maintained in software which is separate from dedicated search hardware, all of the processing can proceed without search hardware involvement. When such is done, only the instructions indicated with an "*" involve changes that must be made to the actual hardware registers and tables. Each deletion involves the modification of one search table entry (or modification of the registers root 23 and root leaf).

```
Delete Branch(Search Key)
       local variables: Search Table Address, Done,
          Parent, Grandparent, Keep, Keep Leaf
       Search Table Address=Root
       Parent=Root
       Grandparent=Root
       Done=Root Leaf
       while not(Done):
          Grandparent=Parent
          Parent=Search Table Address
          if (search Key [Select[Search Table
             Address] ]="1"
             [comment: single Search Key bit identified]
                Done=Left Leaf [Search Table Address]
                Search Table Address=Left [Search Table
                   Address]
          otherwise:
                Done=Right Leaf [Search Table Address]
                Search Table Address=Right [Search Table
                   Address]
       [comment: this is what is done when the leaf to be
          deleted has been found]
       if (VC Key[Search Table Address]=Search key):
          Release VC Table Entry(Search Table Address)
          if (Search Table Address=Root) Empty
             Tree="true"                                   *
       otherwise:
          if(Left[Parent]=Search Table Address):
             Keep=Right[Parent]
             Keep Leaf=Right Leaf[Parent]
          otherwise:
             Keep=Left[Parent]
             Keep Leaf=Left Leaf[Parent]
          if (Parent=Root):
             Root=Keep                                     *
             Root Leaf=Keep Leaf                           *
          otherwise:
             if (Left[Grandparent]=Parent:
                Left[Grandparent]=Keep                     *
                Left Leaf[Grandparent]=Keep Leaf           *
             otherwise:
                Right[Grandparent]=Keep                    *
                Right Leaf[Grandparent]=Keep Leaf          *
          Release Search Table Entry(Parent)
```

In the event an application requires that $2^n$ VPI/VCI addresses should be represented in a VPI/VCI address table, each with an unique VPI/VCI address value. That table would then have $2^n$ entries, as would the associated search table. The width of the search table entries would be, in the embodiment described above, $5+1+n+1+n=7+2\times n$ bits (see FIG. 2). The VPI/VCI address values can be identified using the Get VC Table Address process described above, which can be implemented using circuitry shown in FIG. 4. During each search, the number of search table entries that must be processed (branching points) would never be more than the number of bits in the search key, 28 in the case of a VPI/VCI address. It can however be fewer than this number.

The search table is preferred to be replicated in the controlling software, facilitating the separate usage of the Insert branch and Delete Branch processes when the search tree must be modified. Usage of these processes result in the determination of a limited number of changes that would have to be made to the actual search table, or the root and root leaf registers.

It is possible to make much more elaborate searches to identify ATM cells using the above described invention. All of the processes described, i.e. Get VC Table Address, Insert Branch and Delete Branch, make use of a generic Search Key. Nominally Search Key is set to the VPI/VCI address value of a cell, but it could be set to include other combinations of bits that could be utilized to identify each cell. Bits in the routing header of cells could be utilized for example, or some of the VPI/VCI address bits could be ignored. Depending on how many bits are involved, the width of the select field in the search table may have to be modified so that all of them can be inspected.

A more flexible usage of the approach includes the identification of cells when some of the identity information in those cells determines how other identity information should be interpreted. For example, the value of a few "decider" bits in a routing header may indicate that in one case the VPI/VCI address bits should be considered for further identification, and that in another case they should be ignored and another group of routing bits be considered. This would constitute a form of hierarchical identification.

Hierarchical identification can be readily handled with this approach. In the example presented, the top portion of the search tree would handle discrimination of the "decider" bits, leading to subtrees in which either the VPI/VCI address bits are discriminated between, or the other bits are. In such cases the properties of the search tree do not change. The number of search table entries remains the same as the number of VPI/VCI addresses which must be identified, and the tree is searched in exactly the same manner (using the Get VC Table Address process or the circuitry shown in FIG. 4). All that changes is that the range of the select field is different in different portions of the search tree.

While the deletion of search tables entries is done the same way when hierarchical identification is being performed, using the Delete Branch process, the addition of entries must be handled differently. This is because the group of the bits which are considered during the discrimination process is different in each sub-tree. The Insert Branch process must, as a result, be run on each sub-tree separately, although its basic operation remains the same.

In order to save time, it may be desirable in some cases to limit the number of search table accesses required by the VPI/VCI address identification method. In such cases the search of the tree can be initiated with a direct look-up in a random access memory bypass table. That is, a limited number of the most significant bits of the VPI/VCI address (search key) can be used to directly address the bypass table. The bypass table contains addresses in the search table where the search can continue down different portions of the search tree. The fields in the bypass table would be:

bypass leaf: a single bit that indicates if the bypass address is a terminating one.

bypass: address of the search table entry where the search should begin, i.e. the root of the search sub-tree. when bypass leaf=1 this address is a VC table address.

The length of the bypass table is $2^m$ entries if m bits of the VPI/VCI address value are used for direct look-up. If $2^n$ VPI/VCI address values are being identified, the bypass table must be n+1 bits wide. The Get VC Table Address, Insert Branch and Delete Branch algorithms must be modified in a straight-forward manner to make this approach possible.

Direct look-up is more difficult for hierarchical identification because hierarchical identification is employed when it is not known which bits of the search key should be used as the address for the direct look-up. That is, when there is no simple way of assembling search key bits to use as a bypass table address. If the requirements of a particular hierarchical identification task are known, it may be possible to assemble the search key bits in an efficient way. Otherwise a general method is as follows.

A bit selector table is employed as shown in FIG. 5. FIG. 5 corresponds to the example search tree shown in FIG. 3 and the example search table shown in FIG. 2. The length of the bit selector table is $2^m$ entries if m bits of the search key are to be used for direct look-up. the bit selector table must be 6 bits wide (5+1) for a search key of up to 32 bits. The bit selector table has two fields:

exit: single bit indicating if a leaf has been encountered, and that a bypass table look-up should immediately occur.

select: determines which bit of the search key should be inspected for the branching decision.

Starting at the second entry in the bit selector table, select values are recovered which indicate which bit of the search key should next be considered. That bit determines, using a shift and add calculation, which entry in the bit selector table (BST) the next select value should be recovered from. The process is as follows, expressed in pseudo-code:

```
Get Bypass Table Address(Search Key)
    local variables: BST Address, cycle
    BST Address=1
    cycle=1
    while (Exit[BST Address]≠"1" and cycle < m):
        BST Address= 2 · BST Address+Search
            Key[Select[BST Address]]
        cycle=cycle+1
    if (BST Address>2^m) BST Address=BST Address-2^m
    return (BST Address)
```

The search process continues for m cycles until m bits have been considered. At this point the bit selector table (BST) address will range between $2^m$ and $2^{m+1}-1$. The most significant bit of the BST address is thus ignored (as it will be "1" in all cases), and the remainder of the BST address is used to address the bypass table in the manner of a direct look-up.

Alternatively, if a search tree leaf is encountered during this process, the exit bit will indicate that the bit selector table search should be aborted and the current BST address should be used to address the bypass table. Should this be necessary the nature of this search will ensure that there are no conflicts with addresses determined during a complete search.

It should be noted that all of the above processes can be applied in a completely general way. For example, while the search key has generally been described as being a VPI/VCI address, it can be any arbitrary j bit value for which it is desired that another binary value, having fewer than j bits, be directly associated. As noted above, the method can be applied in any application in which content addressable memory addressing is desired.

A person understanding this invention may now conceive of alternative structures and embodiments or variations of the above. All of those which fall within the scope of the claims appended hereto are considered to be part of the present invention.

I claim:

1. A searching apparatus comprising:

(a) a memory storing a search table, the search table comprising records, each record comprising a select word, a left leaf field, a left address field, a right leaf field and a right address field, (b) means for receiving an input word to be searched, (c) means for selecting one bit of the input word based on a value in a select word of a first record, (d) means for reading a left or right address field in said record, based on a binary value of said one bit, (e) means for reading a left or right leaf field in said record based on said binary value of said one bit, (f) means for selecting another record based on data stored in said left or right address field in the event of one particular binary value being stored in a corresponding left or right leaf field, (g) means for providing the data stored in said left or right address field at an output port in the event of another particular binary value being stored in said corresponding left or right leaf field, as an address to another table for identifying a record corresponding to the input word.

2. A searching apparatus as defined in claim 1 in which the selecting means is a multiplexer for receiving all of the bits of the input word, for receiving the value of the select word and outputting a single bit of the input word determined by the value of the select word.

3. A searching apparatus as defined in claim 2 in which the means for reading a left or right address field in said record is a multiplexer for receiving a left leaf and left address of said record at one set of inputs and a right leaf and right address of said record at another set of inputs, for receiving the single bit output from the multiplexer as a select control, and for outputting either the left leaf and left address or said right leaf and right address depending on the binary value of the select bit.

4. A searching apparatus as defined in claim 3 including means for addressing a subsequent record of the search table using said output left or right address.

5. A searching apparatus as defined in claim 4 in which the address of said subsequent record addressed by said output left or right address is the value stored in the select field.

6. A searching apparatus as defined in claim 5 in which the multiplexers are implemented in a software controlled microprocessor.

7. A searching apparatus as defined in claim 1 in which the means for receiving receives a cell of an asynchronous transfer mode signal comprising a header portion and a payload portion, the header portion comprising a virtual path identifier/vertical channel identifier (VPI/VCT) and means for providing the VPI/VCI to the receiving means as the input word.

8. A method of searching a table stored in a memory for a record identifying a stored data word corresponding to a binary input data word, wherein the table is comprised of a plurality of records containing a select value field, a left search table address field, a right search table address field, and left and right search table address leaf fields, comprising:

(a) selecting a particular single bit of the binary input data word based on a value stored in a select value field, (b) reading either the left or right search table address fields of the record containing said value stored in said first select value field, depending on the binary value of said particular single bit of the input data word indicated, (c) in the event a leaf field corresponding to the read left or right search table address stores a first binary value, repeating steps (a) and (b) using a record identified by the read left or right search table address, (d) in the event a leaf field corresponding to the read left or right search table address stores a second binary value, terminating the search and using the left or right search table address as an address for said data word stored in a second table.

9. A method as defined in claim 8 in which the left or right search table address which identifies the record in step (c) is a value stored in another select value field of said identified record.

10. A method as defined in claim 9 in which said first binary value is a "0".

11. A method as defined in claim 10 in which a left search table address field is searched in the event the binary value of said particular single bit is a "1" and in which a right search table address field is searched in the event the binary value of said particular single bit is a "0".

12. A method of searching a table stored in memory for a record containing a stored data value corresponding to an input data value comprising:

(a) identifying a single bit of the input data value, (b) searching a corresponding bit of each stored data value from one end of the table toward the other until a change in the value of said corresponding bit is detected, (c) looking up a leaf bit, stored in association with the identification of the bit of the input data value, which indicates whether the changed value is part of the stored data value to be located, (d) in the event the leaf bit is of one binary value, repeating steps (a), (b) and (c) using a less significant bit as the identified single bit, but searching the table in an opposite direction, (e) in the event the leaf bit is of another binary value, terminating the search and identifying a record containing the changed value as the stored data value to be located.

13. A method as defined in claim 12 in which the single bit of the input data to be searched is identified by an address derived from a group of successive least significant bits of stored data values one of which is to be located by the search.

14. A method as defined in claim 12 including identifying a less significant single bit by looking up an identifying address of said less significant single bit stored in association with said single bit identification of step (a).

15. A method as defined in claim 14 in which the address of said less significant single bit is identified by either of two values, one based on whether the searching of step (b) is to be carried out in one direction and the other based on whether the searching of step (b) is to be carried out in the other direction.

* * * * *